Oct. 20, 1953     J. C. McCUNE     2,656,022
REINFORCED CAST BRAKE SHOE
Original Filed May 31, 1950
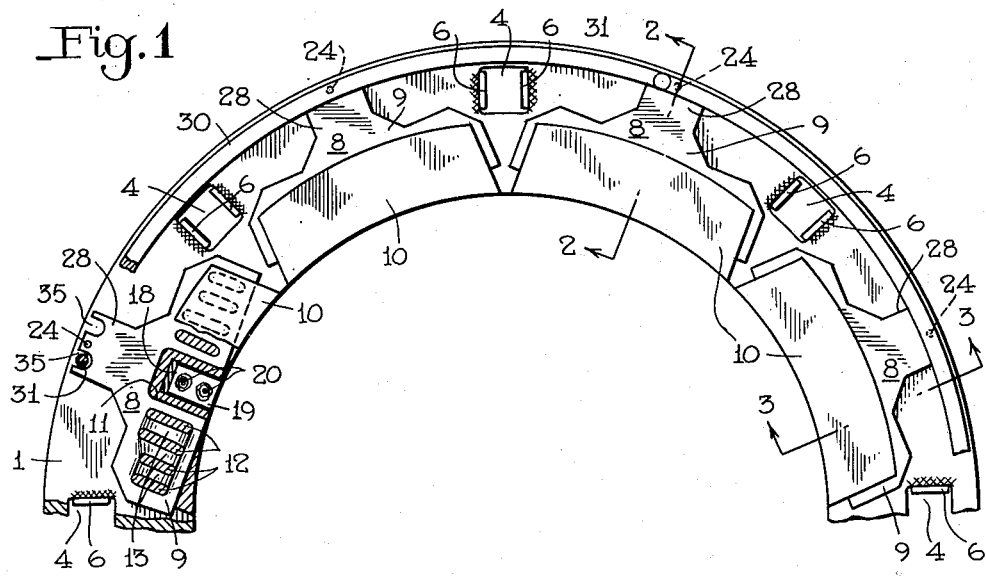
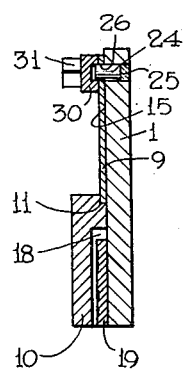
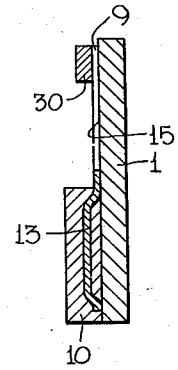
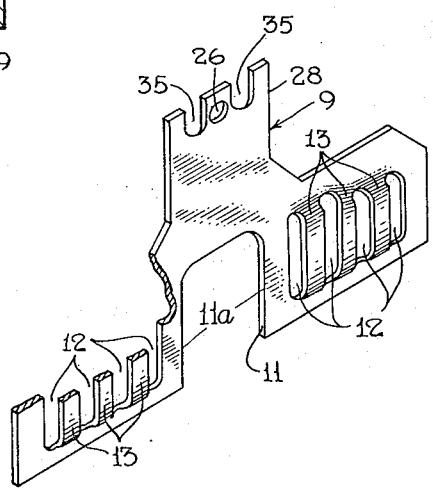
INVENTOR.
Joseph C. McCune
BY
Frank E. Miller,
ATTORNEY Patented Oct. 20, 1953

2,656,022

UNITED STATES PATENT OFFICE 2,656,022

REINFORCED CAST BRAKE SHOE

Joseph C. McCune, Edgewood, Pa., assignor to Westinghouse Air Brake Company, a corporation of Pennsylvania Original application May 31, 1950, Serial No. 165,303. Divided and this application May 16, 1951, Serial No. 226,665

2 Claims. (Cl. 188—258)

This invention relates to reinforced cast brake shoes and more particularly to such brake shoes for a disk brake stator, the present application being a division of my copending United States application Serial No. 165,303, filed May 31, 1950.

It is a prime object of the invention to provide a novel, easily replaced, reinforced cast brake shoe for use on such as the stators of a disk brake.

Other objects and advantages of the invention will become apparent from the following more detailed description of the invention taken in connection with the accompanying drawing in which; Fig. 1 is a face view of a segment of an annular friction element utilizing a plurality of brake shoes embodying the invention; Fig. 2 is a cross-sectional view taken along the line 2—2 in Fig. 1; Fig. 3 is a cross-sectional view taken along the line 3—3 in Fig. 1; and Fig. 4 is a perspective view of a backing plate comprised in the novel brake shoe structure.

Description

Referring to the drawing, a friction element utilizing the novel brake shoe embodying the invention comprises an annular body 1 and is adapted particularly for use as a non-rotatable braking element of a disk brake by provision of a plurality of aligned, circumferentially spaced-apart, rectangular openings 4 to accommodate the usual non-rotatable torque bars (not shown) on which the body 1 is thereby adapted to be slidably mounted. By sliding movement of the body 1 on the usual torque bars, braking engagement between the non-rotatable friction element and a rotatable friction element or elements (not shown) may be affected in the well-known manner. Braking torque forces resulting from such braking engagement will be transmitted to the non-rotatable torque bars (not shown) by respective shoulders formed by wear pads 6 welded to respective edges of openings 4. The pads 6 afford a greater bearing surface for abutment with the torque bars than the thickness of the body at openings 4 affords and protects the edges of the openings 4 from excessive wear. Termination of braking engagement is effected by slidable movement of body 1 on the torque bars (not shown) in a direction away from the rotatable braking element or elements (not shown).

The body 1 carries a plurality of circumferentially spaced apart removable brake shoe members 8. Each brake shoe member 8 comprises a backing plate 9 of sheet steel which may be formed by stamping, for example, and upon one side of which is cast a brake shoe 10 for frictional interengagement with corresponding shoes on the rotatable braking element (not shown), the opposite side of said member being flat for engagement with a flat surface 15 of body 1. Each of the backing plates 9 is provided with a shoe carrying portion having a rectangular shaped slot 11 midway between the ends of the plate and open at the inner edge of the plate (as mounted on body 1), and a plurality of spaced apart openings 12 at opposite sides of said slot which openings are elongated in the direction of the radius of the body 1 as said plate is mounted on said body. The portions or webs 13 provided between the openings 12 at each side of slots 11 are pressed out of the plane of the encircling portion of the plate 9, in a direction away from the side of the plate adapted to engage the body 1, a distance exceeding the thickness of said plate so as to provide at the body side of each web a recess into and through which molten metal may flow via and between openings 12 during casting of the shoe 10 onto said plate, which shoe upon cooling, provides a flat surface of backing plate and shoe for mounting on the smooth plane surface 15 of the annular body 1. The webs 13 thus being encircled by metal integral with the metal at the braking side of the plate acts to securely hold the brake shoe to said plate. In the back of each cast shoe 10 within the groove 11 is formed, preferably during casting, a rectangular slot 18 to accommodate a torque transmitting lug 19 attached by means of such as welds 20 to the face 15 at the inner peripheral edge of body 1 equidistant from adjacent openings 4. Each of the lugs 19 is preferably rectangular in shape to provide two opposite shoulders extending parallel to a radius of the body 1 for free sliding engagement with corresponding shoulders formed by the slot 18 in the shoe 10. A slight clearance between torque lugs 19 and shoes 10 exists to allow for thermal expansion of such shoes during heavy prolonged brake application.

Each of the brake shoe members 8 is held in place radially of the annular body 1 by a retaining pin 24 rigidly attached to said body, by such as a weld 25, in radial alignment with one of the lugs 19. An opening 26 in a projecting portion 28 of each backing plate 9 is provided to accommodate the pin 24. The length of the shoe carrying portion of the backing plate is less than the distance between adjacent openings 4 so that in assembly of the shoe member 8 to the body 1, when the friction element is in position in a brake, each member may be slipped radially inward of said body between the adjacent respective torque bars (not shown) extending through the openings 4 into place on the lugs 19, and the respective opening 26 in the backing plates 9 may then be brought into registry with and slipped over the respective retaining pin 24. All shoe members 8, once positioned as above, are then held so positioned in contact with the surface 15 of the body 1 by an annular retaining ring 30 removably secured by means such as cap screws 31 to said body. The annular retaining ring 30 when in place is disposed adjacent to the outer peripheral edge of the annular body 1 in engagement with the radially outward projecting ends of each portion 28 of the backing plates 9 and covering projecting ends of the retaining pins 24; sockets being provided in said ring at the locations of pins 24 to accommodate the ends of same and aid in locating the ring prior to insertion of cap screws 31. The projecting ends of each of the portions 28 of the backing plates 9 are provided with slots 35 one at either side of the respective pin 24 and open to the outer edge of the plate through which the cap screws 31 may extend in securing the ring 30 to the body 1. The shoe members 8 easily may be removed from the body 1, for replacement, for example, by removal of the cap screws 31 and the retaining ring 30, after which said members may be freed from the pins 24 and slipped radially outward from the lugs 19 between openings 4.

It should be pointed out that during employment of the assembled friction element in a disk brake, when the shoes 10 are in frictional braking engagement with other shoes in such brake, torque forces resultant from such engagement is transmitted substantially directly from the shoes to the body 1 by way of the lugs 19 in which they are in engagement. The backing plates 9 are subjected to little if any such torque forces and act substantially exclusively as mediums through which the shoes 10 are attached to the body 1 for carriage thereby.

*Summary*

It will now be seen that I have provided an improved friction element particularly adapted for use as a non-rotatable friction braking element in a disk brake for railway use, which friction element comprises removable friction shoes which are easily replaceable and which will not crack or warp with excessive prolonged use.

Having now described my invention, what I claim as new and desire to secure by Letters Patent, is:

1. In a disk brake or the like, a friction member comprising a flat plate having a slot open to one edge and a plurality of spaced apart webs pressed from one side of said plate beyond the opposite side a distance exceeding the thickness of said plate and integrally connected at opposite ends to said plate, and a brake shoe cast on said opposite side and encircling said webs and the edges of said slot to provide a recess within said slot open to said one edge of said plate, and said shoe terminating flush with said one side of said plate.

2. In a disk brake or the like, a friction member for an annular braking element comprising a flat plate arranged for mounting with one side against said element and having a slot open to an edge inward of said element and an opening adjacent an opposite edge of said plate, said plate having at either side of said slot a plurality of openings elongated in the general direction of the radius of said element and comprising portions between said openings displaced from said one side of said plate, and a brake shoe cast on the opposite side of said plate, through said openings and around said displaced portions and over the sides of said slot flush with said one face of said plate.

JOSEPH C. McCUNE.

References Cited in the file of this patent

UNITED STATES PATENTS

| Number | Name | Date |
|---|---|---|
| 877,055 | Cook | Jan. 21, 1908 |
| 949,945 | Pries | Feb. 22, 1910 |
| 1,224,476 | McDonough | May 1, 1917 |
| 2,218,615 | McCune | Oct. 22, 1940 |
| 2,498,501 | Newell | Feb. 21, 1950 |